J. W. HOWERY.
TRANSMISSION DEVICE.
APPLICATION FILED JUNE 9, 1913.
1,096,720.
Patented May 12, 1914.
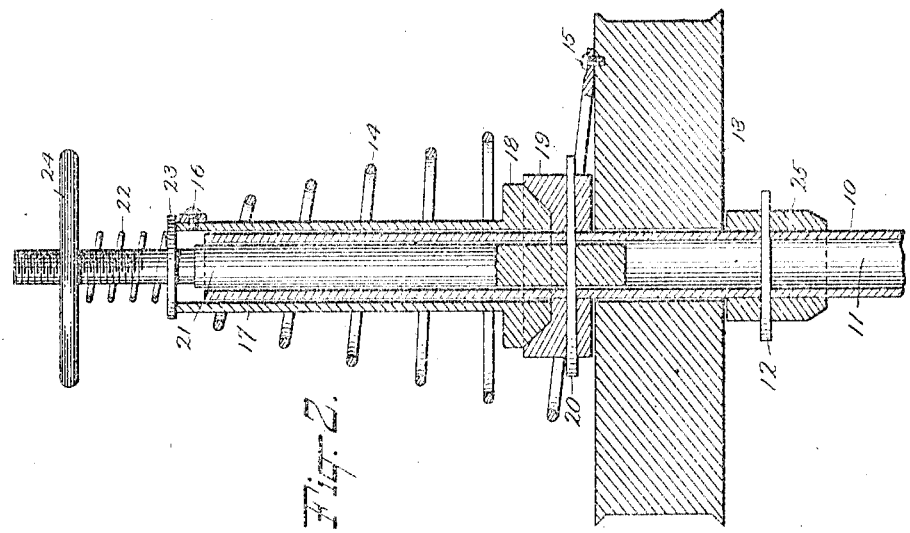
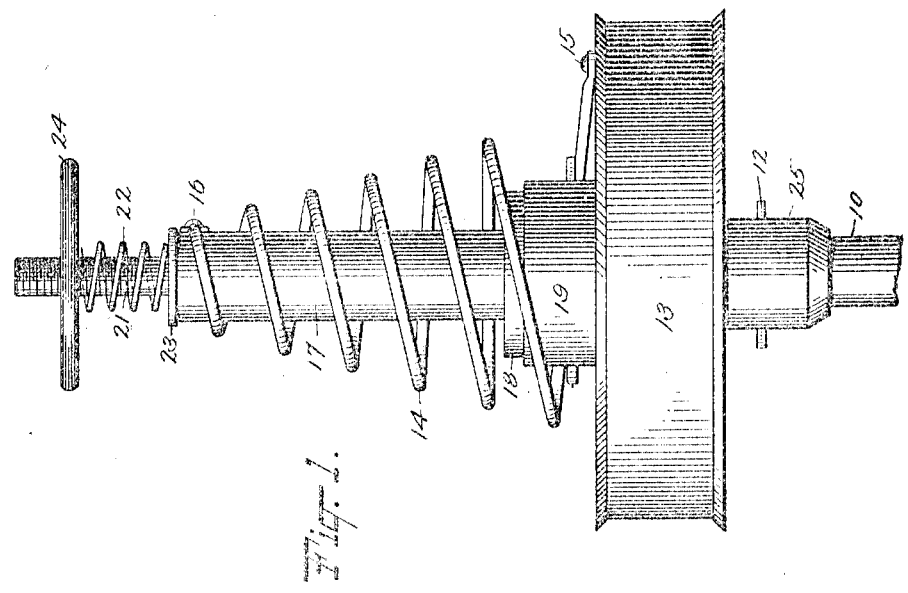
WITNESSES
INVENTOR
John W. Howery
BY
ATTORNEYS

UNITED STATES PATENT OFFICE.

JOHN W. HOWERY, OF DARLINGTON, WISCONSIN.

TRANSMISSION DEVICE.

1,096,720.  Specification of Letters Patent.  Patented May 12, 1914.

Application filed June 9, 1913. Serial No. 772,548.

*To all whom it may concern:*

Be it known that I, JOHN W. HOWERY, a citizen of the United States, and a resident of Darlington, in the county of Lafayette and State of Wisconsin, have invented a new and Improved Transmission Device, of which the following is a full, clear, and exact description.

The invention relates to transmission devices having an interposed spring affording a cushion between a drive pulley and a shaft actuated thereby.

It is the design of my invention to improve transmission devices of the general character herein specified, to the end that efficiency of operation may be promoted as well as economy of manufacture and simplicity of adjustment and control.

The invention will be particularly explained in the specific description following.

Reference is to be had to the accompanying drawings forming a part of this specification, in which similar characters of reference indicate corresponding parts in both views.

Figure 1 is a side elevation of a transmission device embodying my invention; and Fig. 2 is a longitudinal sectional view.

In constructing a transmission device in accordance with my invention a hollow shaft 10 is provided which is adapted to be secured to any shaft 11 to be driven. The connection between the hollow shaft 10 and the shaft 11 may be by means of a tapered pin 12. On the shaft 10 is loosely mounted a drive pulley 13, to one end of which is secured a helical spring 14 by a set screw 15 or equivalent means. The other end of said spring is secured by a set screw 16 or the like to one end of a sleeve 17 loosely surrounding the hollow shaft 10. On the opposite end of the sleeve 17 a friction clutch member 18 is formed or secured, and a mating friction clutch member 19 is fixed on the said shaft 10 by a transverse pin 20 or otherwise.

Within the shaft 10 is a spindle or shaft section 21, and the pin 20 passes through the inner end of the same so that the hollow shaft, clutch member 19 and the spindle 20 are in fixed relation to each other to turn together. Coiled on the outer end of the spindle 21 is a spring 22, one end of which abuts a washer or collar 23 loose on the sleeve 17 at the end of the sleeve 17. The other end of the spring abuts a hand wheel 24 threaded on to the end of the spindle 21. The spring 22 in pressing against the washer 23 forces the latter against the outer end of the sleeve 17 carrying the clutch member 18, and the pressure exerted on the spring 22 is subject to the movement of the hand wheel 24, so that by turning said wheel in one direction the pressure of the spring is increased and the clutch members are caused to have frictional engagement.

When the clutch members are disengaged it will be seen that the pulley 13 when driven by a suitable belt, not shown, will turn loosely on the shaft 10, and through the medium of the helical spring 14 will turn the clutch sleeve 17 without actuating the shaft 11 to be driven. Upon pressure being applied by turning the wheel 24 the clutch members 18—19 will be engaged and the turning of the clutch sleeve 17 will now turn the clutch member 19 and with it the hollow shaft 10 and the shaft 11 to which it is secured.

The helical spring 14 is made conical and its enlarged end is of sufficient diameter to surround the clutch members 18 and 19 so that the spring may turn about the clutch members when the latter are disengaged.

The numeral 25 indicates a collar which may be secured to the hollow shaft 10 by the same pin 12 that fastens the said shaft to the end of the driven shaft 11.

It will be observed that since the several elements of the transmission device are all embodied in an attachment which may be readily applied to the shaft to be driven by connecting the hollow shaft 10 thereto, the invention may be readily secured in place. The device is particularly useful in the driving of cream separators or dynamos requiring very steady speed, but is applicable generally as a transmission device in connection with a drive pulley and driven shaft. When employed with an internal combustion engine the yielding connection between the pulley and driven elements serves to absorb the shocks due to the periodic explosion and prevents jarring.

Having thus described my invention, what I claim as new and desire to secure by Letters Patent is:—

1. A transmission device comprising a hollow shaft, a loose pulley thereon, a sleeve loose on the hollow shaft, a helical spring in conical form having connection at one end with the pulley and at the other end with the said sleeve, a clutch element in fixed relation to the sleeve, and a clutch element in fixed relation to the hollow shaft, the said clutch elements being within the convolutions at the enlarged end of the spring.

2. A transmission device comprising a hollow shaft adapted to be secured to a shaft to be driven, a pulley loose on the hollow shaft, a sleeve also loose on the shaft, a helical spring surrounding the sleeve, said spring being connected at one end with the pulley and at the other end with the sleeve, a clutch member fixed on the hollow shaft, a clutch member in fixed relation to the sleeve, a spindle within the hollow shaft and having an end extending beyond the sleeve, a washer on the spindle bearing against the end of the sleeve opposite the clutch, a coiled spring surrounding the outer end of the spindle and bearing at one end against said washer, and a hand wheel on the spindle against which the opposite end of the coiled spring abuts.

3. A transmission device comprising a hollow shaft adapted to be secured to a shaft to be driven, a collar on said hollow shaft, a pulley loose on the shaft adjacent the collar, a fixed clutch member on the hollow shaft at the opposite side of the pulley, a sleeve on the hollow shaft having a clutch member to coöperate with the clutch member on the hollow shaft, and a helical spring of cone form connected with the pulley at its larger end and connected at its smaller end to the sleeve, said larger end of the spring being coiled outside of the clutch members.

In testimony whereof I have signed my name to this specification in the presence of two subscribing witnesses.

JOHN W. HOWERY.

Witnesses:
P. E. ORTON,
EMMA V. HOOPER.